United States Patent [19]

Horiuchi et al.

[11] Patent Number: 4,882,302

[45] Date of Patent: Nov. 21, 1989

[54] LATHANIDE SERIES OXIDE MODIFIED ALKALINE-RESISTANT GLASS

[75] Inventors: Tetsuro Horiuchi, Gardena; Arnold E. Goldman, Canoga Park, both of Calif.; Durai N. Raghavan, Plano, Tex.

[73] Assignee: Ensci, Inc., Woodland Hills, Calif.

[21] Appl. No.: 203,518

[22] Filed: May 19, 1988

Related U.S. Application Data

[63] Continuation of Ser. No. 937,376, Dec. 3, 1986, abandoned, which is a continuation-in-part of Ser. No. 702,971, Feb. 19, 1985, abandoned.

[51] Int. Cl.$^4$ .................. C03C 6/02; C03C 13/00; C04B 14/42
[52] U.S. Cl. ............................... 501/27; 501/35; 501/64; 106/99
[58] Field of Search ............... 501/27, 35, 64; 156/99

[56] References Cited

U.S. PATENT DOCUMENTS

| | | | |
|---|---|---|---|
| 4,298,388 | 11/1981 | Sack | 501/64 |
| 4,330,628 | 5/1982 | Cochran et al. | 501/64 |
| 4,521,524 | 6/1985 | Yamashita | 501/64 |

FOREIGN PATENT DOCUMENTS

| | | | |
|---|---|---|---|
| 58-64243 | 4/1983 | Japan | 501/64 |
| 58-167444 | 10/1983 | Japan | 501/35 |
| WO82-03386 | 10/1982 | PCT Int'l Appl. | 501/27 |
| 988782 | 1/1983 | U.S.S.R. | 501/64 |

*Primary Examiner*—Mark L. Bell
*Attorney, Agent, or Firm*—Frank J. Uxa

[57] ABSTRACT

The invention relates to alkaline resistant glasses, particularly glass fibers, which comprise silica, calcia and at least one lanthanide series metal oxide effective to enhance the alkali resistance of the glasses.

23 Claims, No Drawings

LATHANIDE SERIES OXIDE MODIFIED ALKALINE-RESISTANT GLASS

RELATED APPLICATION This application is a continuation of co-pending application Ser. No. 937,376, abandoned, filed Dec. 3, 1986, which in turn is a continuation-in-part of co-pending application Ser. No. 702,971, filed Feb. 19, 1985, now abandoned.

BACKGROUND OF THE INVENTION

1. Field:

The invention herein relates to alkaline-resistant glasses. While it pertains to glass bodies generally, it has particular pertinence to glasses which are fiberizable.

2. State of the art:

Glass compositions which are exposed for prolonged periods of time benefit from being alkaline (or alkali) resistant. Such glass compositions are also advantageously easily fiberizable. In one particularly useful embodiment, such glass compositions--in the form of fibers--are used in concrete or other cementatious matrixes to provide strength and other properties to the matrix. It would be advantageous to provide such glass compositions at reduced cost, and/or with improved alkali resistance, and/or with enhanced fiberizability.

Alkaline resistance is provided in some glasses by the inclusion of substantial quantities of zirconia and/or titania, such as in AR glasses of Pilkington. Although these materials enhance the alkaline resistance of glass bodies, these are refractory materials which increase the melting point of such glasses. Also, zirconia and titania tend to add cost to the glass inasmuch as these are much more expensive materials than silica, soda, calcia and the usual components of soda lime silica glasses. In addition, it would be advantageous to provide glass compositions having suitable meltability and fiberizability within a wide working range of temperatures.

The lanthanide series metals, often called the rare earth metals, are those metals designated in La, Ce, Pr, Nd, Pm, Sm, Eu, Gd, Tb, Dy, Ho, Er, Tm, Yb, and Lu.

Lanthanide series metal oxides has been disclosed as a replacement for the calcia component in the starting zirconia-containing composition (Pilkington's Cem-Fil fibers) to improve chemical stability, and glasses from the silica/alumina/yttria/lanthana/titania system show improved resistance to alkali attack when compared with recognized zirconia compositions. See: Molycorp, Inc. brochure entitled: "LN'S...KEY TO TOUGHER CONCRETE, Alkali-resistant glass fibers containing lanthanides", Lanthology 510, B.T.K. July /84. Others have suggested the inclusion of lanthanides in glass compositions for one or more purposes. See: U.S. Pat. Nos. 2,805,166; 3,573,078; 3,783,092; 3,861,925; 4,298,388; 4,330,628; 4,345,037; and 4,521,524; U.K. Patents Nos.1,200,732; 1,243,972; and 1,307,357; U.S.S.R. Patent Document No.988,782; and Japanese Patent Documents Nos.58-64,243; and 58-167,444. Still, further improvements in alkali resistance and/or fiberizability would be advantageous.

The natural mineral zeolites are a group of hydrous alkali and/or alkaline earth aluminosilicates which have an open three-dimensional crystalline framework. While a large number of individual mineral zeolites are known and have been described in the literature, eleven (11) minerals make up the major group of mineral zeolites; analcime, chabazite, clinoptilolite, erionite, ferrierite, heulandite, laumontite, mordenite, natrolite, phillipsite and wairakite. The chemical and physical properties of these major mineral zeolites, as well as the properties of many of the minor mineral zeolites, are described extensively in Lefond (ed.), *Industrial Minerals and Rocks* (4th Ed., 1975, pp. 1235–1274; Breck, *Zeolite Molecular Sieves* (1974), especially Chapter 3: and Mumpton (ed.), *Mineralogy and Geology of Natural Zeolites*, Vol. 4 (Mineralogical Society of America November, 1977). These publications also describe the geologic occurrence of the natural mineral zeolites and some industrial and agricultural uses which have been proposed or in which the natural mineral zeolites are now being used commercially.

It is important to note that the natural mineral zeolites are an entirely different class of materials from the "synthetic zeolites" which have been widely described in many recent articles and patents. Because there is no universally recognized system for naming the synthetic zeolites, and because some of the synthetic materials exhibit x-ray diffraction patterns which suggest possible similarities in structure with the natural mineral zeolites, some reports in the literature and patents have described certain synthetic zeolites as "synthetic" versions of the natural mineral zeolites. Thus, for instance, certain synthetic zeolites have been described as "synthetic analcime" or "synthetic mordenite" and so forth. As noted in the aforementioned Breck reference, however, this approach is technically unsound and has merely led to confusion between the two (2) otherwise distinct classes of materials the natural mineral zeolites and synthetic zeolites. While it has been recognized that there are structural similarities between the two groups, it is clear that the natural mineral zeolites constitute a class of materials significantly separate and distinct in structure and properties from the synthetic zeolites.

Glasses are vitreous materials composed largely of silica. Because silica is a highly refractory material, however, substantial quantities of soda ash, lime or other fluxing materials are added to the silica to permit the glass-forming composition to be melted at reasonable temperatures. Small quantities of other materials, usually elemental materials or oxides, are commonly added to glass melts to provide particular properties such as color or chemical resistance to the finished glass. One experiment has been reported in which a clinoptilolite and glass mixture was fired at 800° C. (well below the melting point of either) to produce what was described as a porous low density glass composition; see Mumpton, supra, p. 197, referring to Tamura Japanese published application 74/098,817 (1974). Also, see "Safety evaluation of simulated high-level waste glass products, (1). Thermal stability." Banba, Taunetaka; Tashiro, Shingo (Tokal Res. Establ. Japan at Energy Res. Inst., Tokal, Japan). Report 1980, JAERI-M-8706, 20 pp. (Japan).

OBJECTS OF THE INVENTION:

It is an object of the invention to form glass compositions, e.g., glass fibers, having improved properties, in particular, fiberizability and/or alkaline resistance.

Another object of the invention is to modify naturally occurring zeolite materials with lanthanide series metal compounds.

A further object of the invention is to form glass fibers containing at least one lanthanide series metal oxide in an amount effective to enhance the alkali resistance of the glass fibers.

An additional object of the invention is to provide composites including reinforcing glass fibers containing at least one lanthanide series metal oxide in an amount effective to enhance the alkali resistance of the glass fibers. Other objects and advantages of the present invention will become apparent hereinafter.

SUMMARY OF THE INVENTION

The invention herein comprises glass compositions which have good working and fiber forming properties and which have outstanding resistance to alkaline environments. Such glass compositions, in particular glass fibers; are characterized by a lanthanide series metal oxide content, an alkaline earth metal oxide, in particular calcia, content, a silica content and, preferably an alumina content and a reduced alkali metal oxide content. The present compositions include defined amounts of alkaline earth metal oxide, silica, and preferably alumina, which effectively form glass fibers. In addition, the inclusion of at least one lanthanide series metal oxide in the composition is effective to enhance the alkali resistance of the glass, e.g., fibers, without unduly adversely affecting the fiberizability of the composition. Thus, the present compositions require reduced amounts, if any, of various other components, e.g., zirconia, thoria and alkali metal oxides, which have previously been used to provide alkali resistance to other glass compositions. In one embodiment, the present glass compositions are derived from a naturally occurring zeolite to which one or more lanthanide series metal containing materials and, preferably, at least one alkaline earth metal compound, especially calcium compound or calcium and magnesium compounds, are added to yield a glass composition in accordance with the present invention. In one embodiment, alumina or an aluminum compound may be added to such glass-forming materials.

Included within the scope of the present invention are glass bodies, particularly fibers, formed from the aforesaid glass compositions.

DETAILED DESCRIPTION AND PREFERRED EMBODIMENTS

The present invention relates to lanthanide series metal oxide-modified, alkaline-resistant glasses containing silica, alumina and one or more alkaline earth oxides, and particularly to glasses and glass fibers comprising at least one lanthanide series metal oxide in an amount effective to enhance the alkali resistance of the glasses and glass fibers, silica, alumina, calcia and combinations of calcia and magnesia.

One particularly useful glass composition comprises glass fibers comprising:

Silica —about 30% to about 70% by weight, alumina —0 to (preferably about 3% to) about 35% by weight, calcia —about 5% to (preferably about 23% to) about 60% by weight, magnesia —0% to about 20%, preferably less than about 6%, by weight, at least one lanthanide series metal oxide —about 0.1% to (preferably about 1% to) about 20% by weight effective to enhance the alkali resistance of the glass fibers, zirconia plus thoria —0% to less than 5% by weight, and alkali metal oxide (e.g., Na2O) —0% to less than about 10% by weight. In one embodiment, the glass fibers contain 0% to less than about 20% by weight of alumina. It is preferred that the calcia plus magnesia content of the glass fibers be greater than about 10% by weight.

Another particularly useful glass composition comprises glass fibers comprising:

Silica —about 30% to about 70% by weight, alumina —about 0% to less than about 20% by weight, calcia —about 5% to about 60% by weight, magnesia —0% to less than about 6% by weight, at least one lanthanide series metal oxide —about 0.1% to (preferably about 1% to) about 20% by weight effective to enhance the alkali resistance of the glass fibers, zirconia plus thoria —0% to 5% by weight, and alkali metal oxide (e.g., Na2O) —0% to less than about 10% by weight.

A still further particularly useful glass composition comprises glass fibers comprising:

Silica —about 30% to about 70% by weight, alumina —about 3% to about 35% by weight, calcia —more than about 18% by weight, magnesia —0% to about 20% by weight, at least one lanthanide series metal oxide —about 0.1% to (preferably about 1% to) about 20% by weight effective to enhance the alkali resistance of the glass fibers, zirconia —0% to less than about 6% by weight, and alkali metal oxide (preferably Na2O) —0% to about 10% by weight.

Although any one or more of the lanthanide series metal oxides can be used in the present glass compositions, it is preferred that at least about 40%, more preferably at least about 50%, by weight of the lanthanide series metal oxide content of the present glasses be derived from the oxides of a metal selected from the group consisting of lanthanum, cerium, neodymium, praseodymium, ytterbium and mixtures thereof. Mixtures of lanthanide series metal oxides may be used in the present invention.

The lanthanide series metal or metals may be included in the glass forming mixture as an oxide or other compound capable of producing such oxide at glass forming conditions. Such components include, without limitation, acetates, carbonates, halides, nitrates, sulfates and the like.

As noted above, the present glasses preferably include about 1% to about 20% of lanthanide series metal oxide (calculated as the oxide). More preferably, such glasses contain about 1.5% to about 12% by weight and still more preferably about 2% to about 8% by weight, of lanthanide series metal oxide (calculated as the oxide). In each case, however, the lanthanide series metal oxide is present in a amount effective to enhance the alkali resistance of the glass.

Preferably, the present glasses contain less than about 3% by weight of boria, and more preferably are substantially boria-free (i.e., less than about 0.3% by weight of boria). Preferably, the present glasses contain less than about 3% by weight and, more preferably, less than about 1% by weight of alkali metal oxide, and still more preferably are substantially alkali metal oxide-free (i.e., less than about 0.3% by weight of alkali metal oxide). This is particularly surprising since in many previous attempts to produce alkali resistant glasses, alkali metal oxides were employed as a principal ingredient to provide enhanced alkali resistance. In the present glasses, alkaline earth metal oxides, in particular calcia, provides a degree of alkali resistance and the lanthanide series metal oxide is effective to enhance or increase the alkali resistance of the glass. Substantial alkali resistance is achieved in glasses substantially free of alkali metal oxide.

Preferably, the present glasses contain less than about 3% by weight of each of zirconia, titania and thoria. More preferably, the present compositions are substantially free of zirconia, titania and thoria (i.e., containing less than about 0.3% by weight of zirconia, titania or thoria). Preferably, the present compositions include less than about 5% by weight of tin oxide ($SnO_2$).

The silica content of the present compositions more preferably is in the range of about 40% to about 65%, and still more preferably about 45% to about 60%, by weight. In one embodiment, the alumina content of the present compositions is in the range of about 7% to about 35%, preferably about 7% to about 30%, by weight. In one embodiment, the calcia content of the present glasses is in the range of about 10% to about 40% by weight, preferably in the range of about 18% to about 35% and more preferably about 20% to about 30%, by weight. The magnesia content of the present glasses is preferably less than about 5% by weight.

In one embodiment, the invention relates to glasses formed from naturally occurring zeolites and especially to glasses wherein such zeolites are present in at least substantial quantities in the glass-forming mixture, preferably providing the predominance of the glass-formers, in particular, the silica present in such mixtures.

It is significant, as described hereinafter, that such glasses may be easily and relatively inexpensively formed by melting at least one lanthanide series metal oxide forming material and an alkaline earth metal material, especially a calcium compound, for example in the form of limestone, or a calcium compound and a magnesium compound, such as found in dolomite, with one or more naturally occurring zeolites. However, glasses of excellent resistance to alkaline attack may be formed by starting with at least one lanthanide series metal oxide forming material and conventional materials such as silica, an alumina forming material, limestone and/or dolomite.

The alkaline-resistant glass composition may be readily formed by mixing calcium carbonate with a naturally occurring zeolite material. As indicated in applications Serial Nos. 430,743; 360,516; 537,255; and 554,602, filed Sept. 30, 1982; Mar. 22, 1982 and Sept. 28, 1983; and Nov. 23, 1983, respectively, commonly assigned, the descriptions contained therein being incorporated herein by reference, many naturally occurring zeolite materials may be formed into glasses under appropriate conditions. Naturally occurring zeolites, as a glass-forming material, have many advantages. Naturally occurring zeolites have already undergone reaction and the various elements are intimately mixed and reacted with one another. Also, the zeolite materials are particularly useful inasmuch as they have a very low sulphur content. In particular, very useful glass bodies may be formed by combining various quantities of at least one lanthanide series metal oxide-forming material and/or an alumina-forming material and/or a calcia-forming material and/or a magnesia-forming material with a zeolite of the following compositional range:

Silica —about 60% to about 85%, alumina —about 6% to about 30%, $Fe_2O_3$ —about 0.1% to about 3%, calcia —about 0% to about 25%, magnesia —about 0% to about 5%, potassia —up to about 5% soda —up to about 7%, with the percentages expressed being in weight percent.

In particular, it has been found that additions of minor quantities of at least one lanthanide series metal oxide-forming material and about 10%, more preferably about 20% to about 50% by weight of calcium carbonate mixed with a zeolite of the above-indicated composition results, after melting of the finely ground material, in a glass having good working and forming properties and excellent resistance to an alkaline environment. Furthermore, these glasses advantageously melt at temperatures in the range of about 1250° C. to about 1500° C., with selected compositions melting below 1350° C. Although carbonates are preferred reactants, other salts or compounds of alkaline earth metals, especially calcium and magnesium, could be utilized. In utilizing zeolites with a relatively low alumina content, for example less than about 10% to about 15% by weight of zeolite material, it is preferable to include additional alumina-forming material in the glass-forming mixture to enhance the fiberizability of the resulting glass.

A glass-forming composition may be readily prepared by mixing finely ground lanthanide series metal-containing material and limestone with a finely ground zeolite material, such as the composition identified above. The zeolite material, inasmuch as it is a pre-reacted crystalline material, for example, calcium aluminum silicates, reacts readily and efficiently with the lanthanide series metal-containing material and calcium carbonate of the limestone to form a glass composition having a lanthanide series metal oxide content and relatively high calcia loading. The lanthanide series metal-containing material appears to provide the glass with alkali resistance, as well as with improved working and forming properties and especially enhances the fiberizability of the glass.

The lanthanide series metal oxide-containing glass material, upon cooling, exhibits good physical properties, having strengths and other qualities substantially equivalent to a typical silicate fiber glass and having resistance to alkaline solutions in the range of about ten-fold to about twenty-fold better than a typical soda-lime silicate window glass. Also, the resistance to alkaline materials tends to increase as the calcia content increases from about 20% to about 50% by weight in the glass and then tends to decrease slightly with greater loadings of calcia. Appropriate balancing of addition of the lanthanide series metal oxide-forming material and, preferably, an alumina-forming material and alkaline earth metal components results in formation of a glass having excellent fiberizability without loss of alkaline resistance.

Besides improving the fiberizability and durability of the glass, glasses containing lanthanide series oxide and moderate to relatively high calcia loadings have other advantages as well. The addition of calcia and/or magnesia, and optionally alumina, tends to even out variances in the zeolite composition. Zeolites are naturally occurring materials and are not homogeneous or uniform in their composition.

The zeolites contain relatively substantial quantities of water, that is, are hydrated materials. Hydrated crystalline materials generally tend to melt at a lower temperature. Thus, there are further advantages to beginning the glass-forming operation with a pre-reacted zeolite, rather than initiating it with silica.

The melting temperatures of the lanthanide series oxide-modified silica, alumina, calcia-containing glasses of this invention come within a range, i.e., about 1250° C. to about 1500° C., and especially about 1300° C. to about 1400° C., which permits the drawing of glass fibers through platinum dies. For example, such glass fibers may be drawn through a platinum or platinum-rhodium die at temperatures of about 1100° C. to about 1350° C. The glass fibers could also be formed by spinning or other techniques. However, formation of continuous strands is best accomplished by drawing through an orifice in a platinum or platinum-rhodium body. A particular advantage of the lanthanide series oxide-modified glasses described herein resides in their excellent working and fiber-forming properties, their resistance to crystallization and uniform viscosity across a broad temperature range at fiber-forming temperatures.

The present glasses, particularly in the form of bubbles (microspheres), fibers, flakes and the like, more particularly as fibers, can advantageously be used to reinforce alkaline matrix materials. Composites comprising a major amount of alkaline matrix material and a minor amount of alkaline resistant glass, as described herein, effective to enhance the strength of the composite are within the scope of the present invention.

The term "alkaline matrix materials" as used herein means those materials (1) which are alkaline in nature, i.e., inherently alkaline, and/or (2) which are useful in and/or are exposed to an alkaline environment, that is an alkaline environment originating outside the composite itself to which the composite is exposed. Thus, alkaline matrix materials include materials which when used in and/or exposed to an alkaline environment are improved, e.g., strengthened, by being composited with alkaline resistant glass. The glass is effective to enhance the strength of the composite relative to the strength of a composite made without the glass.

The alkaline matrix materials may be substantially inorganic or substantially organic. Although the substantially inorganic matrices may be exposed to alkaline environments, the preferred substantially inorganic matrix materials for use in the present composites are those which are alkaline in nature. More preferably, the substantially inorganic matrix material is selected from the group consisting of cement, concrete, gypsum, plaster, stucco, and mixtures thereof.

The substantially organic matrix materials useful in the present composites are preferably polymeric materials, in particular thermosetting polymeric materials. The substantially organic matrix materials can be at least to some extent alkaline in nature. In many instances, however, the composites containing substantially organic matrix materials are useful in and/or are exposed to alkaline environments and therefore benefit from the alkaline resistant glass contained therein.

Fibers of the glass compositions of this invention are particularly useful inasmuch as they may be used to strengthen bodies which are highly alkaline in nature, for example, cement and plaster. Such fibers may also be used to strengthen organic matrices of various types. Reinforcement of cement with such fibers, however, provides a particularly advantageous use inasmuch as asbestos has been frequently used heretofore for that purpose. Because of various health and/or environmental concerns, the use of asbestos is being discontinued. Continuous strands or mats of glass fibers having the glass compositions described herein effectively reinforce concrete bodies.

Glass fibers formed from glasses of this invention have particular utility as a reinforcement material for cementatious bodies, e.g., cement and concrete. Composite, e.g., cementatious bodies exhibit enhanced strength when such bodies include, e.g., are reinforced with, a minor amount of glass fiber, preferably in the range of about 1% to about 10% by weight, and more preferably about 1.5% to about 7.5% by weight glass fibers of the type described herein. The fibers are included in composite bodies in sufficient amount to enhance the strength of such bodies.

The following examples are intended to illustrate the invention of this specification. However, variations thereon would be apparent to one of skill in the art based upon this specification. All such variations are intended to be within the scope of the invention of this specification.

EXAMPLE I

Two glass compositions (having a component make-up as set forth in Table I) were prepared employing a naturally occurring zeolite material as the silica source. The lanthanide series metal oxide, designated as LnO hereinafter and in the Tables, content of these glasses was derived from a mixture of rare earth metal compounds (primarily oxides) in which about 80% by weight of the lanthanide series metal was a mixture of lanthanum and cerium. These glass compositions were drawn into fibers and tested, along with commercial E-glass fibers using the standard and conventional strand-in-cement test ($SIC_{24}$). This test measures the tensile strength of fiber strands after 24 hours' exposure under water at 80° C. Prior to exposure, the middle section of each strand is encased in a block of ordinary portland cement to provide a cementatious environment. The tensile strength measured by the $SIC_{24}$ is expressed in Newtons/millimeter$^2$.

Results of this testing are shown in Table I. Tw represents the upper limit of the working temperature range (the range of temperatures in which fibers can be satisfactorily drawn) of the composition, and $T_L$ represents the lower limit of the working temperature range of the composition. A wide working temperature range is one indication of good fiberizability. The glasses designated (1) and (2) which include LnO have substantially improved alkali resistance (as measured by $SIC_{24}$) relative to the commercial E-glass.

TABLE I

|  | E-glass | (1) | (2) |
| --- | --- | --- | --- |
| $SiO_2$ | 54.4 | 49.6 | 50.9 |
| $Al_2O_3$ | 14.3 | 14.7 | 15.1 |
| $Fe_2O_3$ | 0.4 | 0.6 | 0.2 |
| CaO | 17.3 | 17.8 | 17.6 |
| MgO | 4.5 | 2.1 | 1.8 |
| BaO |  | 3.2 | 3.3 |
| $K_2O$ | 0.2 | 2.8 | 0.1 |
| $Na_2O$ | 0.3 | 1.8 | 3.0 |
| LnO |  | 5.8 | 6.2 |
| $B_2O_3$ | 7.8 | 1.7 | 1.8 |
| $TiO_2$ | 0.6 |  |  |
| $F_2$ | 0.3 |  |  |
| Tw (°C.) | 1275 | 1255 | 1275 |
| $T_L$ (°C.) | 1100 | 1185 | 1190 |
| $SIC_{24}(N/mm^2)$* | 350 | 500 | 490 |

*Newtons/millimeter$^2$

EXAMPLE II

Additional glass compositions, designated as Ln-0 Ln-1, LN-2, Ln-3, and Ln-4 (and having the component make-up as set forth in Table II) were prepared using conventional glass-forming materials and the lanthanide series metal oxide source as described in Example I. The composition designated as Ln-0 includes no lanthanide series metal oxide. Also, the glasses were prepared from feedstock components selected to minimize the concentrations of boria, titania, zirconia and alkali metal oxide in the final glass compositions. Each of these glass compositions were drawn into fibers and tested using $SIC_{24}$.

Results of this testing are shown in Table II. The lanthanide series metal oxide-containing compositions have both outstanding alkali resistance and good fiberizability. The results indicate that the presence of lanthanide series metal oxide in the present glass compositions enhances the alkali resistance of the composition without substantially adversely affecting the fiber forming abilities of the composition. Each of these lanthanide series metal oxide-containing compositions is substantially alkali metal oxide-free. The Ln-3 and Ln-4 compositions appear to have comparable alkali resistance to Pilkington's CEM-FIL(I) based on $SIC_{24}$ results.

Very minor quantities of other elements, for example boron, manganese, zirconium, titanium, vanadium, antimony, barium, in combined form, may be present in the naturally occurring zeolite component. The quantities of such materials generally are individually below about 0.1% by weight and are usually less than 0.01% by weight and frequently present in amounts less than 0.005% by weight. Various other materials, especially those having metallic elements, may be found in trace amounts in the zeolite material.

TABLE II

|  | Ln-0 | Ln-1 | Ln-2 | Ln-3 | Ln-4 |
|---|---|---|---|---|---|
| SiO | 61.1 | 60.5 | 59.6 | 58.1 | 57.4 |
| $Al_2O_3$ | 11.3 | 11.2 | 11.1 | 10.8 | 10.7 |
| $Fe_2O_3$ | 0.1 | 0.1 | 0.1 | 0.1 | 0.1 |
| CaO | 24.4 | 24.1 | 23.7 | 23.2 | 23.5 |
| MgO | 2.9 | 2.8 | 2.8 | 2.7 | 2.7 |
| $Na_2O$ | 0.1 | 0.1 | 0.1 | 0.1 | 0.1 |
| $TiO_2$ | 0.1 | 0.1 | 0.1 | 0.1 | 0.1 |
| LnO |  | 1.0 | 2.5 | 4.9 | 4.9 |
| $F_2$ |  |  |  |  | 0.6 |
| $T_W$ (°C.) | 1360 | 1340 | 1320 | 1315 | 1300 |
| $T_L$(°C.) | 1190 | 1185 | 1175 | 1175 | 1160 |
| $SIC_{24}(N/mm^2)$ | 405 | — | 455 | 540 | 540 |

*Newtons/millimeter$^2$

In forming the alkali resistant, lanthanide oxide-containing glasses of this invention, it is preferred, if starting with a zeolite material, to have such zeolite material present as at least about 35% by weight of the glass batch mixture. If the zeolite provides substantially all the silica component for the resulting glass, then quantities of at least about 40% to about 50% by weight or more of the zeolite may be utilized in the glass batch mixture.

The glasses of this invention have excellent resistance to moisture degradation and do not degrade o deteriorate during normal or extended storage periods.

The present glass compositions preferably include about 0.1% to about 1.5% by weight of at least one halogen (halide) component, more preferably, fluorine (fluoride) component, calculated as elemental halogen. Also, the present compositions preferably include about 0.01% to about 0.7%, more preferably, about 0.05% to about 0.5%, by weight of iron oxide, calculated as $Fe_2O_3$.

The low sulfate content of naturally occurring zeolites is important in their utilization as ingredients in glass-forming processes. Sulfates tend to degrade during glass melting conditions, yielding sulfur dioxide and other objectionable sulfur compounds. Environmental concerns militate against use in glass-making processes of any raw material containing sulfates, sulfites and other sulfur compounds.

Although the instant invention has been described as lanthanide metal oxide-containing glasses having relatively high loadings of calcia, it is to be recognized that at least minor substitutions of other alkaline earth metal oxides in lieu of calcia may be made. For example, magnesium compounds, particularly magnesium carbonate may be substituted for at least some of the calcium carbonate in preparing a batch for melting into an alkaline-resistant glass. Similarly, barium and strontium compounds may be substituted as well as beryllium compounds, many of which are naturally occurring materials found in the same geographic regions as zeolites.

Sources of alkaline earth metals to form oxides in the glasses of this invention are as follows:

| Alkaline Earth Metal Compound | Source |
|---|---|
| Calcium Carbonate | Limestone |
|  | Marble |
|  | Chalk |
| Magnesium Carbonate | Dolomite |
| Magnesium Silicate | Serpentine |
| Barium Carbonate | Wetherite |
| Strontium Carbonate | Strontianite |
| Beryllium Aluminum Silicate | Beryl |

Sources of calcium and magnesium carbonates are generally more plentiful and cheaper than sources of barium, strontium or beryllium compounds. Also, beryllium metal is considered toxic, although beryllium oxides bound within a glass body are not hazardous.

Aluminum may be included in the glass batch as alumina, aluminosilicates, e.g., from aluminosilicate glass cullet or as naturally occurring materials such as various clays including kaolin, montmorillonite and the like.

While this invention has been described with respect to various specific examples and embodiments, it is to be understood that the invention is not limited thereto and that it can be variously practiced within the scope of the following claims.

The embodiments of this invention in which an exclusive property or privilege is claimed are as follows:

1. A glass composition comprising alkaline resistant glass fibers comprising: alumina in an amount of about 15.1% or less by weight, silica —about 30% to about 70% by weight, calcia —about 23% to about 60% by weight, magnesia —0% to less than about 6% by weight, at least one lanthanide series metal oxide —about 0.1% to about 20% by weight effective to enhance the alkali resistance of said glass fibers, zirconia plus thoria —0% to about 3% by weight, and alkali metal oxide —0% to less than about 3% by weight.

2. The glass composition of claim 1 wherein said lanthanide series metal oxide is present in an amount in the range of about 1% to about 20% by weight.

3. The glass composition of claim 2 wherein said composition comprises: silica —about 40% to about 65% by weight, and calcia —about 23% to about 40%.

4. The glass composition of claim 1 wherein said lanthanide series metal oxide is present in an amount in the range of about 1.5% to about 12% by weight.

5. The glass composition of claim 4 wherein said lanthanide series metal oxide is present in an amount in the range of about 2% to about 8% by weight.

6. The glass composition of claim 1 wherein said composition is substantially free of alkali metal oxide.

7. The glass composition of claim 5 wherein said composition is substantially free of alkali metal oxide.

8. A glass composition comprising alkaline resistant glass fibers comprising: alumina in an amount of about 15.1% or less by weight, silica —about 30% to about 70% by weight, calcia —about 5% to about 60% by weight, magnesia —0% to less than about 6% by weight, at least one lanthanide series metal oxide —about 0.1% to about 20% by weight effective to enhance the alkali resistance of said glass fibers, zirconia plus thoria —0% to about 3% by weight, and alkali metal oxide —0% to less than about 3% by weight.

9. The glass composition of claim 8 wherein said composition comprises: silica —about 40% to about 65% by weight, alumina —about 6% to about 15.1% by weight, calcia —about 10% to about 40% by weight, and at least one lanthanide series metal oxide —about 1% to about 20% by weight.

10. The glass composition of claim 8 wherein said composition comprises: calcia —about 18% to about 35% by weight and at least one lanthanide series metal oxide —about 1.5% to about 12% by weight.

11. The glass composition of claim 10 wherein said lanthanide series metal oxide is present in an amount in the range of about 2% to about 8% by weight.

12. The glass composition of claim 8 wherein said composition is substantially free of alkali metal oxide.

13. The glass composition of claim 11 wherein said composition is substantially free of alkali metal oxide.

14. A glass-forming mixture comprising a substantial quantity of naturally occurring pre-reacted zeoite material; at least one alkaline earth metal component from a source other than said zeolite material; and a minor quantity of at least one lanthanide series metal compound capable of forming a lanthanide series metal oxide under glass-forming conditions in an amount effective to enhance the alkali resistance of the glass body formed.

15. The glass composition of claim 1 wherein said lanthanide series metal is selected from the group consisting of lanthanum, cerium, neodymium, praseodymium and mixtures thereof.

16. The glass composition of claim 8 wherein said lanthanide series metal is selected from the group consisting of lanthanum, cerium, neodymium, praseodymium and mixtures thereof.

17. The mixture of claim 14 wherein said lanthanide series metal is selected from the group consisting of lanthanum, cerium, neodymium, praseodymium and mixtures thereof.

18. A composite comprising an alkaline matrix material and alkaline resistant glass fibers of claim 1 in an amount effective to enhance the strength of said composite.

19. A composite comprising an alkaline matrix material and alkaline resistant glass fibers of claim 4 in an amount effective to enhance the strength of said composite.

20. A composite comprising an alkaline matrix material and alkaline resistant glass fibers of claim 6 in an amount effective to enhance the strength of said composite.

21. A composite comprising an alkaline matrix material and alkaline resistant glass fibers of claim 8 in an amount effective to enhance the strength of said composite.

22. A composite comprising an alkaline matrix material and alkaline resistant glass fibers of claim 9 in an amount effective to enhance the strength of said composite.

23. A composite comprising an alkaline matrix material and alkaline resistant glass fibers of claim 12 in an amount effective to enhance the strength of said composite.

* * * * *